(12) United States Patent
McArdle et al.

(10) Patent No.: US 8,425,999 B2
(45) Date of Patent: Apr. 23, 2013

(54) TRANSFERABLE CURABLE NON-LIQUID FILM ON A RELEASE SUBSTRATE

(75) Inventors: Ciaran B. McArdle, Dublin (IE); Ligang Zhao, Duesseldorf (DE); Alvaro Nocete Diaz, Barcelona (ES)

(73) Assignees: Henkel Ireland Limited, Monheim (DE); Henkel AG & Co. KGaA, Duesseldorf (DE)

( * ) Notice: Subject to any disclaimer, the term of this patent is extended or adjusted under 35 U.S.C. 154(b) by 10 days.

(21) Appl. No.: 13/038,002

(22) Filed: Mar. 1, 2011

(65) Prior Publication Data

US 2011/0151243 A1    Jun. 23, 2011

Related U.S. Application Data

(63) Continuation of application No. PCT/EP2009/061015, filed on Aug. 26, 2009.

(30) Foreign Application Priority Data

Sep. 1, 2008  (GB) .................... 0815871.9

(51) Int. Cl.
*B05D 3/02* (2006.01)
*B32B 5/18* (2006.01)
*B32B 27/18* (2006.01)
*B32B 27/32* (2006.01)

(52) U.S. Cl.
USPC ....... 428/41.5; 428/317.7; 428/352; 428/521; 428/522; 427/385.5

(58) Field of Classification Search .......... None
See application file for complete search history.

(56) References Cited

U.S. PATENT DOCUMENTS

| 5,154,971 A | 10/1992 | Mitstani | |
| 5,290,838 A * | 3/1994 | Mikuni et al. | 524/157 |
| 2003/0208002 A1* | 11/2003 | Woods et al. | 525/295 |
| 2004/0260024 A1* | 12/2004 | Gehlsen et al. | 525/227 |
| 2006/0240208 A1* | 10/2006 | Ishikawa et al. | 428/40.1 |

FOREIGN PATENT DOCUMENTS

| EP | 0470722 | 2/1992 |
| EP | 0566093 | 10/1993 |
| EP | 0745490 | 12/1996 |
| GB | 1048906 | 11/1966 |
| WO | 8601816 | 3/1986 |
| WO | 9217515 | 10/1992 |
| WO | 9838260 | 9/1998 |
| WO | 0123664 | 4/2001 |
| WO | 0170511 | 9/2001 |

OTHER PUBLICATIONS

Khrustavel et al., Synthesis and X-ray structural study of 1-adamantylmethyl 2-cyanoacrylate and 1,10-decanediol bis-2-cyanoacrylate, Russian Chemical Bulletin, vol. 45, No. 9 (1996).

Guseva et al., "Synthesis of functionality substituted 2-cyanoacrylates", Russian Chemical Bulletin, vol. 43, No. 4 (1994).

Gololobov et al, "A novel approach to the synthesis of bis(2-cyanoacrylates)" (Russian Chemical Bulletin, vol. 4, No. 4, 1995, 760-761).

Gololobov et al, "Synthesis of bis(2-cyanoacrylates) from 2-cyanoacryloyl chloride and 2-butene- and 2-butyne-1,4-diols" (Russian Chemical Bulletin, vol. 45, No. 9, 1996, 2172-2176).

* cited by examiner

*Primary Examiner* — Ramsey Zacharia
(74) *Attorney, Agent, or Firm* — Steven C. Bauman

(57) ABSTRACT

The present invention relates to transferable curable non-liquid film on a release substrate, process for making same, bonding processes utilizing same, assemblies comprising substrates bonded together using same and the cure product of said films. Pre-applied materials are also described.

20 Claims, 1 Drawing Sheet

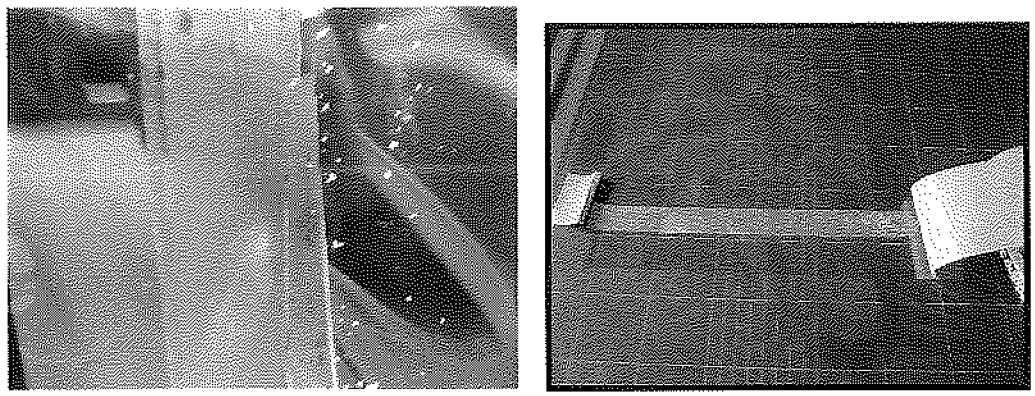

TRANSFERABLE CURABLE NON-LIQUID FILM ON A RELEASE SUBSTRATE

FIELD OF THE INVENTION

The present invention relates to transferable curable non-liquid film on a release substrate, process for making same, bonding processes utilising same, assemblies comprising substrates bonded together using same and the cure product of said films. The invention also includes pre-applied materials such as a pre-applied film alone or on a carrier substrate.

BACKGROUND TO THE INVENTION

It is desirable to provide transferable curable films for various purposes. Such transferable curable films are provided in many forms as per the prior art and are based on many different chemistries.

International Patent Publication No. WO 86/01816 describes a filament-containing support member, whose filaments are wetted with an alpha cyanoacrylate. The document discusses the issue of low viscosity associated with cyanoacrylates and the handling problems associated therewith. The cyanoacrylate is formulated as a gel and then applied to the support member where it is absorbed by the filaments.

The WPIX Abstract for JP 04008781 of Taoka Chemical Co. Ltd describes the transfer of a layer of adhesive carried on a supporting-based material for bonding purposes. The adhesive is described as being an alpha cyanoacrylate. The adhesive is described as being in liquid form.

European Patent Publication EP 0 566 093 describes a thermally conductive electrically insulated pressure sensitive adhesive. A polymer on the tape comprises cyanoalkyl acrylate. Transfer tapes are also mentioned.

Notwithstanding the state of the art above, it is desirable to provide alternatives.

SUMMARY OF THE INVENTION

The present invention relates to an article of manufacture as set out in the claims and below. More particularly, the present invention relates to transferable curable non-liquid film on a release substrate, process for making same, bonding processes utilising same, assemblies comprising substrates bonded together using same and the cure product of said films.

The transferable curable non-liquid film is provided on a release substrate, the film being formed by a composition comprising at least one curable component which is an electron deficient olefin component.

The term non-liquid as applied to the present invention does not include gels. Thus, non-liquid is intended to refer to non-flowable and self-supporting at room temperature. In particular the compositions for forming non-liquid films of the present invention are those capable of forming thin coherent films.

It will be appreciated that an electron deficient olefin component is the primary cure component of the film. It will also be appreciated that the film of the invention is of sufficient area to be useful for (relatively large area) bonding. In particular, a film localised film formation, for example as may occur about a fibre of a fibrous substrate is not a film within the meaning of the invention.

Thus, the article of manufacture of the present invention provides an alternative transferable curable non-liquid film composition which is provided on a release substrate. One particular film may be based on cyanoacrylate adhesive chemistry.

The article of the invention may suitably be used in instant, reactive warm-melt or hot-melt adhesive applications. Use of transferable curable non-liquid cyanoacrylate based films is particularly desirable, since for example, the curable composition in the form of a transferable film may be more easily handled than existing cyanoacrylate compositions, which are generally supplied in a bottle or a tube as low viscosity liquids or gels. The articles of the invention therefore may avoid problems with inadvertent adhesive spillage and skin bonding. The advantages of the invention also include curtailment of vapour release. The present invention also allows for uniform application of the curable film to large area surfaces. The film of the present invention can be utilised to form relatively thick bond lines as compared to, for example, conventional liquid or gel cyanoacrylates.

In particular, the non-liquid film of the invention comprises at least one electron deficient olefin component selected from:

an electron deficient olefin component which is at least one of propargyl, neopentyl, or adamantly ester; or
an electron deficient olefin component comprising a diester; and combinations thereof.

Electron deficient components may be selected from the group consisting of cyanoacrylate esters, methylidene malonate esters or cyanopentadionate esters and combinations thereof.

Suitably, the electron deficient olefin component comprises a cyanoacrylate, in particular a 2-cyanoacrylate.

Suitably the curable components of the present invention are cyanoacrylates and may be selected from alkyl ester 2-cyanoacrylates (α-cyanoacrylates), alkoxyalkyl ester 2-cyanoacrylates, di-cyanoacrylates or adamantyl alcohol cyanoacrylates.

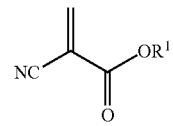

Cyanoacrylates include 2-cyanoacrylates within structure wherein $R^1$ may be selected from $C_1$-$C_{16}$ alkyl, alkoxyalkyl, cycloalkyl, alkenyl, alkynyl, arylalkyl, aryl, allyl, adamantyl and haloalkyl groups. Suitably, alkyl ester 2-cyanoacrylate compounds, such as methyl 2-cyanoacrylate, ethyl 2-cyanooacrylate, n-butyl 2-cyanoacrylate, iso-butyl 2-cyanoacrylate, propyl cyanoacrylate, propargyl cyanoacrylate and β-methoxyethyl cyanoacrylate, octyl cyanoacrylates, allyl cyanoacrylate, propargyl cyanoacrylate, β-methoxyethyl cyanoacrylate and combinations thereof, may be used as the curable component of the compositions of the present invention.

Suitably the electron deficient olefin component comprises a propargyl, neopentyl, or adamantyl cyanoacrylate or a di-cyanoacrylate and combinations thereof.

Other desirable curable cyanoacrylates (CAs) which may be used in the composition of the invention include alkoxyalkyl 2-cyanoacrylate compounds, for example alkoxyalkyl 2-cyanoacrylate compounds having multiple bonds in the alkoxyalkyl chain, such as 3-ethoxylprop-ene 2-cyanoacrylate, propoxyprop-1-ene 2-cyanoacrylate, 3-isopropoxyprop-1-ene, 3-butoxyprop-1-ene 2-cyanoacrylate, 3-(2-ethoxyethoxy)prop-1-ene, vinyl acetate 2-cyanoacrylate, prop-1-yl 2-cyanoacrylate, 3-ethoxyprop-lyne 2-cyanoacrylate, 1,1,2 trichlorobut-1-ene 2-cyanoacrylate and 1-(vinyloxy)acetone 2-cyanoacrylate which are disclosed in the paper "*Organic Chemistry, Synthesis of functionally substituted 2-cyanoacrylates*", Russian Chem. Bull. (43) 4, 1994, 595-598, the entire contents of which are incorporated herein by reference.

Suitably, di-cyanoacrylates adhesive compounds may be employed as the curable component. For example, di-cyanoacrylate compounds such as ethylene glycol 2,2'-dicyanoacrylate, neopentyl glycol 2,2'-dicyanoacrylate and a number of other polyethylene glycol 2,2'-dicyanoacrylates have been disclosed in United Kingdom patent GB 1,045,906, the contents of which are incorporated herein by reference. Additional di-cyanoacrylates which may be used in the present invention have been disclosed by Gololobov et al, in the papers "*Unequivocal Synthesis of Bis(2-Cyanoacrykate) Monomers. I. Via Anthracene Adducts*", Journal of Polymer Science: Polymer Chemistry Edition, Vol. 16, 2475-2507, "*A novel approach to the synthesis of bis(2-cyanoacrylates)*" (Russian Chemical Bulletin, Vol. 4, No. 4, 1995, 760-761) and "*Synthesis of bis(2-cyanoacrylates) from 2-cyanoacryloyl chloride and 2-butene-and 2-butyne-1,4-diols*" (Russian Chemical Bulletin, Vol. 45, No. 9, 1996, 2172-2176), the contents of which are incorporated herein by reference. Examples of desirably di-cyanoacrylates include 2-butene-1,4-diol bis(2-cyanoacrylate), 2-butyne-1,4-diol bis(2-cyanoacrylate), 1,6-hexanediol-bis(2-cyanoacrylate), 1,8-octanediol-bis(2-cyanoacrylate) and ethylene glycol bis(9,10-dihydro-9,10-endo-ethanoanthracene-11-cyano-11-carboxylate) which may be represented by "Bis-A/EGBCA" as an abbreviation.

Suitably, α-cyanoacrylates such as those described in European Patent EP 0 470 722B1, the contents of which are incorporated herein by reference may be employed as the curable component in the compositions of the invention. Specific examples include but are not limited to methyl α-cyanoacrylate, ethyl α-cyanoacrylate, propyl α-cyanoacrylate, allyl α-cyanoacrylate, propargyl α-cyanoacrylate, 2,2,2-trifluoroethyl α-cyanoacrylate, 2,2,3,3-tetrafluoropropyl α-cyanoacrylate, 2-methoxyethyl α-cyanoacrylate and 2-ethoxyethyl α-cyanoacrylate. Particularly suitable are neopentyl α-cyanoacrylates which have excellent adhesive properties even at high temperatures, in addition to whitening prevention properties.

Examples of alternative cyanoacrylates include but are not limited to 1-adamantylmethanol 2-cyanoacrylate and 1,10-decanediol bis-2-cyanoacrylate (Russian Chemical Bulletin, Vol. 45, No. 9, 1996, 2172-2176), either of which may be used herein.

Useful methylidene malonates include those within the structure below:

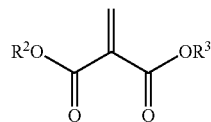

where in this connection $R^2$ and $R^3$ are each independently selected from $C_{1-16}$, alkyl, alkoxyalkyl, cycloalkyl, alkenyl, aralkyl, aryl, allyl or haloalkyl groups.

Conventional cyanoacrylate monomer containing compositions are generally liquids or gels which exhibit low or medium viscosities and rapid polymerisation and thus are not suitable for large area bonding. On their own, such compositions are not suitable for use as transferable curable compositions for flexible substrates such as films, since they will tend to run off the substrate due to their low or medium viscosity. They will generally not be capable of forming coherent thin films. To address this problem it is desirable to use solid-form monomers of the curable component. This will confer the desired coherence to the film. Additional components, such as a film-forming component and/or liquid curable components such as liquid cyanoacrylates may be added to the cyanoacrylate to assist in film formation. The film-forming component essentially helps to solidify any liquid component of the composition. This increases the overall viscosity of the combined materials, which allows the combined materials to be retained on the transfer substrate. The film-forming component may comprise a film-forming agent which may be at least one elastomeric additive component. When solid cyanoacrylates such as neopentyl cyanoacrylates are used there is usually less need to add film forming agent since the curable component will sit on the substrate after it is applied. Where compositions comprising mixtures of solid and liquid cyanoacrylates are used, a suitable amount of a film-forming component may be added to the composition to compensation for the level of liquid curable component present.

In particular for solid monomeric materials that may form non-coherent films for example due to crystalline nature on application, the film-forming components provide a suitable structure or scaffold to provide a coherent film. The coherent film may be achieved by a combination of film-forming components and co-curatives.

Film forming components include film forming agents for example, elastomeric additive components which may be used in the compositions of the invention include but are not limited to, for example, copolymeric ethylene acrylic elastomers, natural or synthetic rubbers such as substituted polyethylenes, resins such as polyvinyl butyral resins and chlorosulfonated polyethylene synthetic rubbers (CSM). Other synthetic rubbers which may be suitable used as additives for the present invention include partially cross-linked butyl rubber compounds such as those butyl rubber products which are commercially available from Royal Elastomers of New Jersey, USA under the brand names KALAR®, DPR®, ISOLENE® and KALENE®.

Ethylene acrylic elastomers may also be desirably used, since these types of elastomers have heat and fluid resistant properties. Generally, these types of elastomers are often used in flexible applications such as hosing and gasket seals and the like. An example of an ethylene acrylic elastomeric material which can be used advantageously in the transferable curable non-liquid film composition of the present invention are ethylene acrylic elastomers. Once such commercially available product is Vamac® available from DuPont Corporation. Use of such elastomer additives will impart to the transferable curable non-liquid films of the invention varying degrees of flexibility depending on the amounts of additive present in the curable film composition while conferring a sufficient non-liquid form. Suitably, the film compositions of the present invention comprising such elastomers are desirable, since transferable curable non-liquid films which are flexible may be more easily provided on the release substrate and may more easily be transferred from the release substrate when required for use that more brittle films.

Desirably, polyvinyl butyral resins may be added to the transferable curable non-liquid film compositions of the present invention. This type of resin is useful since it may increase adhesive binding efficiency, add to the optical clarity of the adhesive material, increase adhesion to a larger number of surfaces, while conferring the transferable curable non-liquid film with increased toughness but maintaining a desired degree of flexibility. One example of such a butyral resin is Butvaeavailable from Kreglinger Europe N.V. Antwero, Belgium.

Chlorosulfonated polyethylene synthetic rubbers (GSM) may be suitably used in the curable film compositions of the present invention. Examples of suitable CSM compositions include, but are not limited to chlorosulfonated synthetic rubbers corresponding to those sold under the tradenames Hypalon® from DuPont Corporation or Toso-CSM® available from Tosoh Europe B.V. Amsterdam, the Netherlands. Desirably, these materials lend the film composition enhanced properties such as chemical resistance, resistance to temperature extremes and give some protection against UV light aging and deterioration.

Desirably, the non-liquid film comprises at least one electron deficient olefin component which is itself non-liquid. One such electron deficient olefin component is that is a non-liquid is neopentyl 2-cyanoacrylate.

Suitably, the non-liquid film comprises at least one electron deficient olefin component which is itself liquid in combination with at least one other film forming component, wherein the combination is non-liquid. Suitable liquid electron deficient olefin components include Loctite® 401 and Loctite® 480 commercial produces available from Henkel Ireland Limited, Dublin 24, Ireland. One such electron deficient olefin component which is a non-liquid is neopentyl 2-cyanoacrylate.

Suitably, the non-liquid film comprises at least one electron deficient olefin component which is itself non-liquid, and for at least one electron deficient olefin component which is itself liquid and at least one film forming component, where the combination is a non-liquid. Suitable liquid electron deficient olefin components include cyanoacrylates, such as Loctite® 401 commercially by Henkel Ireland Limited, Dublin 24, Ireland. One such electron deficient olefin component that is a non-liquid is neopentyl 2-cyanoacrylate. Suitable co-components such as film-forming components are discussed elsewhere herein. The curable film can be formulated for bonding upon contact with another substrate to which it is releasable. Alternatively the released film can be provided in a pre-applied form (transferred to another substrate but ready for subsequent bonding). Later cure can be initiated as appropriate. For example an external stimulus such as heat or light may be applied to induce cure when desired to do so.

Film portions of the film of the invention are releasable for (subsequent curing) as a coherent mass. The material can thus be transferred off the substrate, optionally to another substrate, while maintaining a film form.

It will be appreciated that the film of the invention has bonding properties and can be formulated for desired end-use bonding applications. The transferable curable non-liquid film composition and delivery system of the invention may be desirably used in end applications such as lamination, bookbinding, shoe-assembly, packaging, paper applications and die attachment applications. It will be appreciated that the article of the invention may also be used in the production of structural materials, for example, cyanoacrylate tape may be used to fill or span voids in structures such as a honeycomb structure to provide material structures with desirable properties such as insulation properties including acoustic and thermal insulation. The article of the invention is also useful in medical applications, including wound closure, surgical closures and surgical application and medical device applications etc.

Substrates that can be bonded by releasing the film from an article of the invention include: metals or alloys, glasses and enamels, wood, natural or synthetic fabrics, leather, stone, ceramic, plastics, paper or card, papers or plastics, composites, or living tissue.

Desirably, the article of the invention comprises a release substrate which may be flexible. Particularly desirable are release substrates where are flexible carriers. Suitable examples are flexible sheets and flexible tapes.

A degree of curing may take place in the film but it will be appreciated that the film remains sufficiently uncured so that later bonding can be effected. Generally this means that the composition will remain substantially non-cured.

The release substrate may be of any desired type and will be compatible with the curable component to ensure there is no significant premature curing. It will be appreciated that substrate may be surface treated for this reason.

The release substrate may be of any desired type for example a plastics substrate or a paper substrate or sheet. Other woven or non-woven substrates may be utilised as appropriate. The release system may be provided in a range of substrate sizes particularly those suitable for larger bonding areas.

Cyanoacrylates in the form of a transferable curable non-liquid film composition provided on a substrate is beneficial due to the fact that lacrymation and odour from the cyanoacrylate are suppressed.

The article of the invention may be provided in the form of a web, such as for example in the form of a roll such as provided on a spool. It will be appreciated that the article of the invention may relatively wide for example suitable for forming for laminated arrays or relatively narrow for example to form tapes.

The article of the invention can be employed in a continuous supply process where the release substrate (for example on a spool) is continuously fed into an apparatus that will transfer the film as desired, for example to component parts which are for subsequent bonding using the curable transferred film.

The article of the invention may comprise two opposing sides and each side is provided with curable product and on at least one side the curable product comprising a curable non-liquid film, the film being formed by a composition comprising at least one curable component which is an electron deficient olefin component.

Suitably, the article of the invention a release substrate wherein each side is provided with curable product and on both sides the curable product comprising a curable non-liquid film, the film being formed by a composition comprising at least one curable component which is an electron deficient olefin component. An alternative is to provide a double-sided substrate which is non-release or differential release. In such a case the substrate may be a foam layer. In such a case a film may be formed on the foam substrate desirably of a non-liquid materials such as a cyanoacrylate. A film may be formed on both sides. In such a case it is desirable to protect both sides of the substrate, for example using a release covering such as a siliconised polyester film.

The film formed by the composition of the invention may comprise at least one curable component which is an electron deficient olefin component and the substrate is a foam material.

Desirably the release substrate is a differential release substrate so that one portion of the substrate, such as one surface thereof, will preferentially retain the film. This can be achieved by providing an article where one portion of the substrate has a different release threshold than another portion. This means that the film will be retained on a desired portion even if the film is contacted with both portions. This is particularly useful where the article is folded or wound upon itself. In such an instance it is desirable that different surfaces such as back-to back surfaces can be contacted by being folded or rolled and the film remains on the surface on which it is preferentially retained. Accordingly folding or rolling does not cause undesired fouling, or unwanted bonding between successive folds or rolls. The film remains on the intended surface. Examples of release substrates include release-coated paper and release coated films, such as differential release coated paper and differential release coated films.

If desired the curable film can be protected from ambient conditions such as light, heat or moisture, and to protect it from undesired physical contact. This will mitigate against undesirable cure of the film. Protection can be achieved using a protective member. The protective member may itself be a protective flexible member which overlies the film. The protective member will generally be a release member which allows the film to be preferentially retained on the release substrate. The protective member may take the form of a sheet or tape. It may be formed of a plastics material or any other suitable material including paper. If desired the protective member may be release coated to ensure the film is preferentially released from the protective member (and not removed from the release substrate). Examples include release coated paper and plastic films. Release materials may be UV transparent or opaque as desired as will be selected by the person skilled on the art to allow or prevent UV cure.

The compositions of the present invention may additionally comprise one or more of other components.

The following is a non-exhaustive, exemplary list of additional components which may be utilised in forming compositions of the invention. It will be appreciated that any additional component which is compatible with the film in particular. In particular any additional component should not induce unwanted cure. Suggested additional components which may be used in any desired combination include:
 (a) a filler component such as those comprising one or more of silica, clays, talc etc.,
 (b) a wetting agent component,
 (c) additional reactive components such as those comprising acrylic, styryl, acrylonitrile, epoxy, oxetane or vinyl ether functional monomers or resins,
 (d) cure systems (for example for (c) above) such as those comprising thermal, photochemical and redox cure systems, and
 (e) a stabiliser component, for example for the curable component and/or for (c) above), such as those comprising sulphur dioxide, hydrogen fluoride, nitrogen oxide, phosphoric acid, phosphorus acid, boron trifluoride, stannic chloride, ferric chloride, sulfones, aromatic sulfonic acids.

Additional (generally non-reactive) components can include:
 (f) colorants including dyes and pigments which may have additional functionality such as magnetic properties, fluorescent, or radiopaque or otherwise detectable,
 (g) other additives such as those used in pharmaceutical formulation including actives and other co-formulation components;
 (h) electrically and/or thermally conductive particles which may additionally function as fillers.

The transferable curable non-liquid film compositions of the present invention may further comprise a range of additive components which provide the adhesive with range of varying physical properties (such as those described above) depending on the requirements of the particular application. It will be appreciated that different additives or combinations of different additives may be selected for use in the adhesive film compositions of the invention depending on the desired adhesive application.

Examples of filler components described in (a) include but are not limited to, for example, silicas, quartz, alumina, calcium, clays, talcs and other inorganic filler materials such as polycarbonates and other polymer powders, along with certain acrylate components.

Examples of additional reactive components described in (c) include but are not limited to, for example, acrylic acid monomers and acrylic acid ester derivates, styryl, acrylonitrile, epoxy, oxetane and vinyl ether monomer or resin components and combinations thereof.

Examples of suitable acrylic components (acrylates, methacrylates etc) and derivates include but not limited to 3,3,5 trimethylcyclohexyl methacrylate, acrylate ester, acrylic monomer, alkoxylated lauryl acrylate, alkoxylated phenol acrylate, alkoxylated tetrahydrofurfuryl acrylate, dicyclopentadienyl methacrylate, diethylene glycol methyl ether methacrylate, ethoxylated hydroxyethyl methacrylate, ethoxylated hydroxyethyl methacrylate, ethoxylated nonyl phenol methacrylate, ethoxylated nonyl phenol acrylate, isodecyl methacrylate, isooctyl acrylate, lauryl methacrylate, metallic monomethacrylate, methoxy polyethylene glycol monomethacrylate, methoxy polyethylene glycol monomethacrylate, propoxylated allyl methacrylate, stearyl methacrylate, tridecyl methacrylate, triethylene glycol ethyl ether methacrylate, 1,12 dodecanediol dimethacrylate, 1,3-butylene glycol diacrylate, 1,4-butanediol dimethacrylate, 1,6 hexanediol diacrylate, alkoxylated cyclohexane dimethanol diacrylate, alkoxylated hexanediol diacrylate, alkoxylated neopentyl glycol diacrylate, cyclohexane dimethanol diacrylate, cyclohexane dimethanol dimethacrylate, diethylene glycol diacrylate, neopentyl glycol diacrylate, neopentyl glycol dimethacrylate, 2(2-ethoxyethoxy)ethyl acrylate, 2-phenoxyethyl acrylate, 2-phenoxyethyl methacrylate, C12-C14 alkyl methacrylate, C16-C18 alkyl acrylate, C16-C18 alkyl methacrylate, caprolactone acrylate, cyclic trimethyloipropane formal acrylate, isobornyl acrylate, isobornyl methacrylate, isodecyl acrylate, lauryl acrylate, octyldecyl acrylate, polypropylene glycol monomethacrylate, stearyl acrylate, tetrahydrofurfuryl acrylate, tetrahydrofurfuryl methacrylate, tridecyl acrylate, 1,3-butylene glycol dimethacrylate, hexanediol dimethacrylate, alkoxylated aliphatic diacrylate, diethylene glycol dimethacrylate, dipropylene glycol diacrylate, ethoxylated bisphenol A diacrylate, ethoxylated bisphenol A dimethacrylate, ethylene glycol dimethacrylate, ethylene glycol diacrylate, polyethylene glycol diacrylate, polyethylene glycol dimethacrylate, propoxylated neopentyl glycol diacrylate, tetraethylene glycol diacrylate, tetraethylene glycol dimethacrylate, tricyclodecane dimethanol diacrylate, tricyclodecanedimethanol dimethacrylate, triethylene glycol diacrylate, triethylene glycol dimethacrylate, tripropylene glycol diacrylate, di-trimethylolpropane tetraacrylate, dipentaerythritol pentaacrylate, ethoxylated pentaerythritol tetraacrylate, pentaacrylate ester, pentaerythritol tetraacrylate, ethoxylated trimethylolpropane triacrylate, ethoxylated pentaerythritol triacrylate, propoxylated glyceryl triacrylate, trimethylolpropane triacrylate, pentaerythritol triacrylate, propoxylated trimethylolpropane triacrylate, trimethylolpropane trimethacrylate, acrylic ester, alkoxylated nonylphenol acrylate, metallic diacrylate, modified metallic diacrylate, monofunctional acid ester, trifunctional acid ester, trifunctional methacrylate ester, propoxylated glyceryl triacetate, cyclohexyl methacrylate, methacrylic acid, methyl methacrylate, isobutyl methacrylate, tert-butyl methacrylate, 2 hydroxyethyl acrylate, 2-hydroxypropyl acrylate, 4-hydroxy-butylacrylate, laurel acrylate, dimethylaminoethyl acrylate, methyl acrylate, ethyl acrylate, butyl acrylate, 2-ethyl acrylate, t-butyl acrylate, isobutyl acrylate, 2-hydroxyethyl acrylate, ethyltriglycol methacrylate, 3,3,5-trim ethylcyclohexylmethacrylate, benzyl methacrylate, allyl methacrylate, N,N-dimethylaminoethyl acrylate, N,N-dimethylaminoethyl methacrylate, N,N-dimethylaminoethyl methacrylate methyl chloride quaternary, N,N-diethylaminoethyl acrylate, N,N-diethylaminoethyl methacrylate, tert-butylaminoethyl methacrylate, N-methylacrylamide, N,N-dimethylacrylamide, allyl glycidyl ether, n-butyl glycidyl ether, alicylic diepoxide, vinylcyclohexene monoxide, n-hexyl methacrylate, glycidyl methacrylates, cycloaliphatic acrylates diacel, siloxane methacrylates, 2-(N-ethylperfluorooctane sulfamido)ethyl acrylate, 2-(N-ethylperfluorooctane sulfamido)ethyl methacrylate, methacryloyloxyalkyl functional alkoxysilanes, methylglycidylmethacrylate. These compounds may be added to the adhesive compositions of the present invention to increase reactivity, cure time, etc and additionally they may increase the transparency of the compositions and increase the resistance breakage.

Examples of epoxide, oxetane components include but are not limited to glycidol, styrene oxide, β-methylepichlohydrine, α-pinene oxide, monoepoxide with long chain alkyl groups $C_{12}$-$C_{34}$, monoepoxide with long chain alkyl groups $C_{16}$-$C_{18}$, epoxidized soybean oil, epoxidized linseed oil, cycloaliphatic epoxies, 3-ethyl-3-phenoxymethyl-oxetane, bis([1-ethyl(3-oxetanil)]methyl)ether, 3-ethyl-3-[(2-ethyl xyloxy)methyl]oxetane, 3-ethyl-3-[(tri-ethoxysily 1propoxy)methy]oxetane, oxetanyl-silsesquioxane, epifluorohydrin, 2-isocyanatoethyl methacrylate, bis(2,2,2-1fluoroethyl) maleate, 2-(N-butylperfluorooctanesulfamido)ethyl acrylate, 1H,1H,7H-dodecafluoroheptyl acrylate, 1H,1H,7H-dodecafluoroheptyl methacrylate, 1H,1H,11H-elcosafluoroundecyl acrylate, 1H,1H,11H-elcosafluoroundecyl methacrylate. Benzyl alkoxamines may also be included in the film compositions.

Examples of cure systems described in (d) include but are not limited to, for example, thermal, photochemical and redox cure systems.

Further additive materials such as radiological contrast materials such as barium sulphate or iodine may be added to the compositions of the present invention so that the bonding material may be identified, for example during medical procedures such as X-ray, CT-Scan etc.

Examples of stabiliser components described in (e) which may be suitably used in the compositions of the present invention include hydroquinone, pyrocatechol, resorcinol or derivatives thereof, such as hydroquinone monoethyl ether, or phenols, such as di-t-butylphenol or 2,6-di-t-butyl-p-cresol, 2,2'-methylene-bis-(4-methyl-6-t-butylphenol), bisphenol A, dihydroxydiphenylmethane, and styrenized phenols. For example, acidic stabilizers include sulfuric acid, hydrochloric acid, sulfonic acids, such as methane, ethane or higher sulfonic acids, p-toluene sulfonic acid, phosphoric acid or polyphosphoric acids, silyl esters of strong acids, such as trialkyl chlorosilanes, dialkyl dichlorosilanes, alkyl trichlorosilanes, tetrachlorosilane, trialkyl silylsulfonic acids, trialkyl silyl-p-toluene sulfonates, bis-trialkyl silylsulfate and trialkyl silylphosphoric acid esters. The amount of either stabilizer used to stabilize the electron deficient olefin prepared by the inventive processes is well known to those of ordinary skill in the art, and may be varied depending on the properties of the resulting composition made from the so formed electron deficient olefin.

Examples of additional components include, for example, colourant, actives and/or electrically and/or thermally conductive particles.

It is desirable that the release substrate has an acidic nature at least on those parts to which the film is applied. This may be important for materials that are more stable in the presence of acid, for example electron deficient olefins like cyanoacrylate materials. The acidic nature may be imparted by deposition. For example the acidic nature can be imparted by cationic acid residues from photocationic initiators for example certain sulfonic acid groups may be present in a release coating layer.

Such release coatings generally comprise surface modifier or surface treatment agents which may promote release of the curable film from the transfer substrate by interfering with bonding between the curable film and the transfer substrate. Such release agents allow the curable films of the invention to be easily transferred from the transfer substrate to the article of interest. Such release coating agents typically comprise silicone based substances or mixtures thereof, for example, functionalised polysiloxanes or cationic radiation curable silicones, one example being epoxy functionalised polydimethylsiloxane having a random distribution of epoxy functions in the chain. The materials can be considered to be release agents with very low starting release values. Such polymers are commercially available from Rhodia, Paris, France under SILCOLEASE® brand names and in particular SILCOLEASE® UV POLY205 and SILCOLEASE®POLY206.

Where the non-liquid film comprises at least one electron deficient olefin component which is itself non-liquid, it is desirable that the component has a melting point above about 39° C. That component may be mixed with one or more other liquid components together with a film-forming agent so that the overall combination forms a coherent film.

It will be appreciated that any article of the invention may comprise an interlayer release layer.

It will be appreciated that the article of the invention can be employed as many times as is required to build up a layered material such as a laminate.

Cure after transfer may be initiated on contact with the substrate to which it is applied. Application pressure can also contribute to curing. Other stimuli may also be used where appropriate such as light (for example UV) and heat cure.

Where light cure is employed masking is also possible for selectively inducing cure.

The article of the invention may be provided in a pack, which provides protection from environmental influences such as moisture. Additionally or alternatively where the film is protected by the release layer or an additional protective layer, such as when in a roll, edge protection may be provided.

In another aspect there is provided a process for forming an article comprising a transferable curable non-liquid film on a release substrate comprising the steps of:

depositing a liquid form of a composition comprising at least one curable component which is an electron deficient olefin component onto the release substrate; and forming a non-liquid film from the deposited material.

If required an additional curing step of heating or irradiatinig may be employed to effect cure. Deposition of the liquid form may be carried out by any suitable casting method such as solvent-casting or melt-casting, or spraying or extrusion. Suitable casting methods include slot-die casting, knife over roller, gravue and curtain coating.

Suitably, the method may comprise an additional step of protecting the non-liquid film optionally using a release material.

In a further aspect there is provided a process for bonding a first substrate to a second substrate comprising the steps of transferring film from the release substrate and bonding the substrates together.

Suitably, the first and second substrates may form layers in a laminated structure.

BRIEF DESCRIPTION OF THE DRAWINGS

The invention will be more clearly understood from the following examples, with reference to the accompanying drawings, in which:—

FIG. 1 shows articles formed in the Examples.

DETAILED DESCRIPTION OF THE INVENTION

The solid cyanoacrylates of the present invention are cyanoacrylates, which are typically in solid form at 39° C. and below. Such solid cyanoacrylates include but are not limited to, for example, neopenyl cyanoacrylate and propargyl cyanoacrylate. These solids cyanoacrylates may be prepared by methods such as those described in International Patent Application No. PCT/IE07/000,104, the content of which are incorporated by reference and describes the synthesis and use of a number of iminium salts (which may be in the form of ionic liquids), and a process for producing 2-cyanoacrylates, using the iminium salt.

The compositions of the invention may additionally comprise liquid cyanoacrylate. Suitable liquid cyanoacrylates include but are not limited to cyanoacrylate compositions Loctite 401 and Loctite 480. All such Loctite commercial cyanoacrylate products are available from Henkel Ireland Limited, Dublin 24, Ireland.

The invention uses film forming agents including those based on rubber materials such as ethylene/acrylic acid elastomer compositions for example those based on ethylene/methyl acrylate copolymer. Such rubbers include those commercially available from DuPont Corporation, marketed under the brand name VAMAC®. A particularly suitable rubber is Vamac® MD which comprises 99% ethylene/methyl acrylate copolymer with 0.5% methyl acrylate and 0.5% methyl alcohol additives respectively. The rubber may be dissolved in a suitable solvent to form a rubber solution. The exemplary rubber solution of the present invention is Vamac® MR dissolved in chloroform at room temperature at a 14 wt % concentration.

The transfer substrate may be a paper or plastic substrate. In the present example, a polyester film has been used. The polyester film substrate is siliconized on both sides.

Any suitable sheet coating device may be used to coat the film on the substrate. In the example presented herein a EC 200 draw down coater has been used.

Example 1

Neopentyl cyanoacrylate is provided in solid form and was melted at approximately 70-80° C. in an oil bath. The melted compound was then simply spread onto a suitable substrate on the drawdown coater. It formed a coherent uniform film of curable material.

Example 2

Initially a coating solution was made by mixing Vamac® MR (3.90 g, 48 wt %), neopentyl cyanoacrylate (3.61 g, 41 wt %) and Loctite 401 (0.92 g, 11 wt %) in chloroform. The coating solution was then spread onto a release coated siliconised polyester film by the automatic drawdown coater. The solvent was removed in a vacuum oven. A coherent uniform film of curable material was left on the polyester film. The film can be seen in FIG. 1.

Example 3

A coating solution which was made by mixing Vamac rubber solution (2.50 g, 40 wt %), neopentyl cyanoacrylate (3.50 g, 50 wt %) and Loctite 480 (70 mg, 10 wt %) in chloroform. The coating solution was then spread onto a release coated siliconised polyester film by the automatic drawdown coater. The solvent was removed in a vacuum oven. A coherent uniform film of curable material was left on the polyester film. The film was uniform and black.

Example 4

The dried film of Example 2 was pressed against a glass substrate (microscope slide). The siliconised polyester film was peeled off leaving a coherent uniform film attached to the (first) glass substrate. A second glass substrate (microscope slide) was pressed against the film on the first substrate. The green strength held the assembly intact. Heat was then applied to the assembly (to effect cure). Upon cooling the glass assembly formed a strong bond between the substrates. Upon application of pressure to separate the substrates the substrates failed while the bond remained intact. See FIG. 1.

The prepared film showed good stability after a few days stored in the rolled position, using wax paper as an interliner and the roll edges coated with a holtmelt or polycaprolactone.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. An article comprising a transferable curable non-liquid film on a release substrate, the film being formed from a composition comprising at least one reactive monomer which is an electron deficient olefin component and a film forming component.

2. An article according to claim 1 wherein the non-liquid film comprises at least one electron deficient olefin component selected from the group consisting of cyanoacrylic esters, methylidene malonate esters, cyanopentadionate esters and combinations thereof.

3. An article according to claim 1 wherein the non-liquid film comprises at least one electron deficient olefin component selected from the group consisting of:
   an electron deficient olefin component comprising an ester component selected from the group consisting of propargyl, neopentyl, and adamantyl;
   a di ester; and combinations thereof.

4. An article according to claim 1 wherein the electron deficient olefin component comprises a cyanoacrylate.

5. An article according to claim 1 wherein the electron deficient olefin component comprises propargyl, neopentyl, or adamantyl cyanoacrylate or di cyanoacrylate and combinations thereof.

6. An article according to claim 1 wherein the non-liquid film comprises at least one electron deficient olefin component which is itself non-liquid.

7. An article according to claim 1 wherein the non-liquid film comprises at least one electron deficient olefin component which is itself liquid in combination with at least one other film forming component, wherein the combination is non-liquid.

8. An article according to claim 1 wherein the non-liquid film comprises at least one electron deficient olefin component which is itself non-liquid, at least one electron deficient olefin component which is itself liquid and at least one film forming component, wherein the combination is non-liquid.

9. An article according to claim 1 wherein the release substrate is flexible.

10. An article according to claim 1 wherein the article has two opposing sides and each side is provided with curable product, wherein the curable product on at least one side comprises a curable non-liquid film, the film being formed from a composition comprising at least one reactive monomer which is an electron deficient olefin component and a film forming component.

11. An article according to claim 10 wherein each side is provided with curable product, wherein the curable product on both sides comprises a curable non-liquid film, the film being formed from a composition comprising at least one reactive monomer which is an electron deficient olefin component and a film forming component.

12. An article according to claim 1 wherein the electron deficient olefin comprises a solid cyanoacrylate selected from neopentyl or propargyl cyanoacrylate.

13. An article according to claim 1 wherein the film is formed from a composition comprising non-liquid cyanoacrylate, a liquid cyanoacrylate and a film forming component.

14. An article according to claim 13 wherein the film forming component comprises an ethylene acrylic elastomer.

15. An article according to claim 1, wherein the film forming component is selected from ethylene acrylic elastomers, natural or synthetic rubbers, substituted polyethylenes, polyvinyl butyral resins and chlorosulfonated polyethylene synthetic rubbers.

16. A process for forming the article of claim 1 comprising a transferable curable non-liquid film on a release substrate comprising the steps of:
depositing a liquid form of a composition comprising at least one reactive monomer which is an electron deficient olefin component and a film forming component onto the release substrate; and
forming a non-liquid film from the deposited material.

17. An article comprising a curable non-liquid film on a substrate, the film being formed from a composition comprising at least one reactive monomer which is an electron deficient olefin component and a film forming component and the substrate being a foam material.

18. An article according to claim 17, wherein the film forming component is selected from ethylene acrylic elastomers, natural or synthetic rubbers, substituted polyethylenes, polyvinyl butyral resins and chlorosulfonated polyethylene synthetic rubbers.

19. A heat activatable permanent or release substrate comprising a curable non-liquid film on a substrate, the film being formed by a composition comprising at least one reactive monomer which is an electron deficient olefin component and a film forming component, the electron deficient olefin component being non liquid.

20. An article according to claim 19, wherein the film forming component is selected from ethylene acrylic elastomers, natural or synthetic rubbers, substituted polyethylenes, polyvinyl butyral resins and chlorosulfonated polyethylene synthetic rubbers.

* * * * *